United States Patent
Fröhlich

(10) Patent No.: US 12,432,121 B1
(45) Date of Patent: Sep. 30, 2025

(54) ROLLBACK ORCHESTRATION MODULE FOR DEPLOYED AND DEPENDENT FORECASTING MODELS AT THE EDGE

(71) Applicant: Dell Products L.P., Round Rock, TX (US)

(72) Inventor: Herberth Birck Fröhlich, Florianópolis (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/624,305

(22) Filed: Apr. 2, 2024

(51) Int. Cl.
  *H04L 41/147* (2022.01)
  *G06N 5/022* (2023.01)
  *H04L 41/16* (2022.01)
  *H04L 47/127* (2022.01)

(52) U.S. Cl.
  CPC .......... *H04L 41/147* (2013.01); *G06N 5/022* (2013.01); *H04L 41/16* (2013.01); *H04L 47/127* (2013.01)

(58) Field of Classification Search
  CPC ........ G06N 20/00; G06N 3/045; G06N 3/048; G06N 3/08; G06N 3/084; G06N 5/02; G06N 5/025; G06N 5/04; H04L 41/082; H04L 41/0843; H04L 41/085; H04L 41/0886; H04L 41/0896; H04L 41/145; H04L 41/5009; H04L 41/5054; H04L 41/5087; H04L 41/00; H04L 41/149; H04L 41/147; H04L 2463/102; H04L 41/0856; H04L 41/22
  See application file for complete search history.

(56) References Cited

U.S. PATENT DOCUMENTS

| | | | |
|---|---|---|---|
| 2014/0280193 A1* | 9/2014 | Cronin | G06F 16/2455 707/741 |
| 2018/0330447 A1* | 11/2018 | Slotterback | G06Q 40/06 |
| 2020/0160123 A1* | 5/2020 | Dennison | G06N 3/045 |
| 2021/0208545 A1* | 7/2021 | Zhang | G05B 13/042 |

* cited by examiner

*Primary Examiner* — Djenane M Bayard
(74) *Attorney, Agent, or Firm* — Workman Nydegger

(57) ABSTRACT

Techniques for rolling back a forecasting operation are disclosed. A service determines a rollback permission for a first forecasting model that generates forecasted data. The rollback permission indicates a commitment threshold. The service generates predicted data that predicts data that has not been received from a second forecasting model and uses the predicted data to initiate generation of the forecasted data. After an initial subset of the forecasted data is generated, the service receives up-to-date data from the second forecasting model. The service determines that the commitment threshold of the rollback permission has not been exceeded despite a remaining subset of the forecasted data still awaiting generation. The service temporarily interrupts the generation of the forecasted data. The service causes the first forecasting model to use the up-to-date data to finish generating the remaining subset of the forecasted data.

20 Claims, 6 Drawing Sheets

| LocalClient | {[status, values]}$_1$, {[status, values]}$_2$, ..., {[status, values]}$_n$ |
| RemoteClient$_1$ | {[status, values]}$_1$, {[status, values]}$_2$, ..., {[status, values]}$_n$ |
| RemoteClient$_2$ | {[status, values]}$_1$, {[status, values]}$_2$, ..., {[status, values]}$_n$ |
| RemoteClient$_n$ | {[status, values]}$_1$, {[status, values]}$_2$, ..., {[status, values]}$_n$ |

*Figure 3*

| Steps | Prediction only | | Prediction + Rollback | |
|---|---|---|---|---|
| | Model$_A$ | Model$_B$ | Model$_A$ | Model$_B$ |
| 0 | b1B | b1A | b1B | b1A |
| 1 | s1A | s1B | s1A | s1B |
| 2 | | | | |
| 3 | | | | |
| 4 | | | | |
| 5 | | | | |
| 6 | | | | |
| 7 | | | | |
| 8 | | f1B | | f1B |
| 9 | f1A | p1A | f1A | p1A |
| 10 | p1B | s2B | p1B | s2B |
| 11 | s2A | | s2A | |
| 12 | | | | |
| 13 | r1B | r1A | r1B | r1A |
| 14 | | | rb2A | rb2A |
| 15 | | | | |
| 16 | | | | |
| 17 | | f2B | | f2B |
| 18 | f2A | | f2A | |
| 19 | | | | |

*Figure 4*

ROLLBACK ORCHESTRATION MODULE FOR DEPLOYED AND DEPENDENT FORECASTING MODELS AT THE EDGE

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNOLOGICAL FIELD OF THE DISCLOSURE

Embodiments disclosed herein generally relate to performing forecasting operations in the edge of a network. More particularly, at least some embodiments relate to systems, hardware, software, computer-readable media, and methods for mitigating the delay in chained forecasting procedures in edge environments via the use of a rollback procedure.

BACKGROUND

"Edge computing" generally refers to computing operations performed by devices that operate at the peripheral regions of a network. These edge devices are able to communicate with the core of the network, but it is often the case that these communications occur only when necessary so as to minimize latency.

Many enterprises rely on edge devices to improve the response time of their networks in responding to client request. For instance, edge devices can often cache information locally. When a client requests information, the edge device, which is located closer to the client than the cloud server, can access its cache and provide the desired information to the client in a fast manner. Edge computing also helps reduce bottlenecking and congestion within the core network.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 2 illustrates an example schema that is representative of the various inputs a forecasting model may rely on.

FIG. 3 illustrates an example table outlining various state information.

FIG. 4 illustrates an example table comparing different processes for performing forecasting.

DETAILED DESCRIPTION OF SOME EXAMPLE EMBODIMENTS

Figure 1:
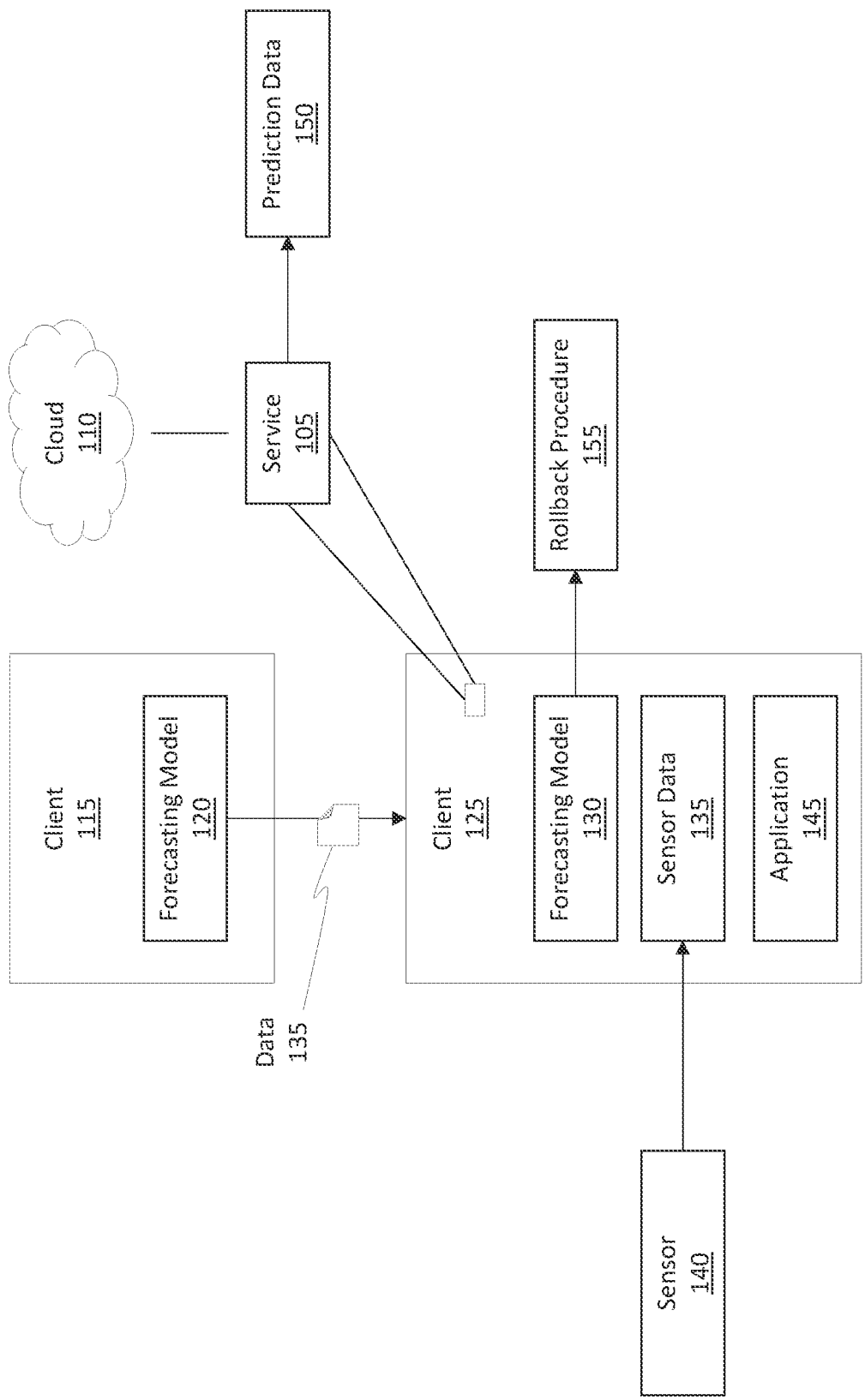
FIG. 1 illustrates an example computing architecture that is capable of performing a rollback procedure for a forecasting model.

Edge devices often have to deal with rigorous "time to data insights" (TDI) and round-trip latencies. TDI becomes even more relevant when systems rely on multiple chained decisions, such as forecasting algorithms/procedures. Forecasting algorithms that are time-dependent on other forecasting algorithms may yield wrong decisions if delays are introduced into the system. These wrong decisions can harm the system's ability to provide near-real time, accurate decisions. The disclosed embodiments are directed to various techniques that rely on an adapted type of rollback procedure to solve the above problems.

Generally, the phrase "rollback netcode" refers to a technique originally developed to mitigate online gaming latency by forecasting the first select number of frames of an event and by rolling back certain predictions if the system's forecasting/predictions were wrong (based on newly acquired truthful state data). For instance, consider a scenario where an online gaming character is moving and then suddenly performs a specific action (e.g., perhaps a punch action). Based on the movement of the character, the system may have forecasted that the character would continue to move in a similar manner. As a result, the forecasted data may include movement data while erroneously omitting the punch action.

In this scenario, however, the forecast is incorrect because the character suddenly performed the punch action. Because the first few frames of the character's punch action are negligible in terms of the user's perception, the user experience will not be inhibited by performing the rollback operation to subsequently account for the punch action.

Notably, instead of starting at the very beginning of the punch operation, the rollback procedure allows the punch operation to start at an operation that is not the beginning of a punch. For instance, suppose the punch operation includes 10 steps. When the rollback procedure is performed, instead of restarting at step 1, the rollback procedure starts the punch operation at a different step, such as perhaps step 5. Such rollback procedures significantly improve the user's experience with the gaming system.

The disclosed embodiments bring about numerous benefits, advantages, and practical applications to edge system forecasting techniques by harnessing the ability to perform forecasting and intelligent rollback operations when the forecasting is determined to be inaccurate. Beneficially, by practicing the disclosed principles, rollback netcode can now be built into a module to interrupt a device's forecasting procedures once reliable states become available. This solution is particularly aligned with systems that operate at the edge, where orchestration of workloads, better usage of assets' data, and intelligent preprocessing takes place. It should be noted, however, how non-edge devices can also incorporate the disclosed principles. Thus, the use of edge devices should be viewed as one example scenario in which the disclosed principles can be used.

As another advantage, the disclosed embodiments are able to provide a single solution that solves latency generated by multiple, interdependent forecasting models. Methods that retain information and then send the information back to a central service are typically not useful in this context as they do solve various orchestration issues, but they do not solve the latency and interdependency issues. It should also be noted how traditional rollback procedures are not able to cope with a combination of TDI and latency. As a result, the disclosed embodiments provide significant improvements over traditional forecasting and rollback operations.

As yet another benefit, in this disclosure, interdependent forecasting models and their dependencies are identified, and the concept of local and remote client takes place. Local clients forecast points based on unreliable state predictions if no reliable states coming from remote clients are available. If reliable states become available, the forecasting procedure is interrupted and restarted, or rather refreshed, at the cost of some partially incorrect points. In doing so, the embodiments improve the overall forecasting ability of devices. Accordingly, these and numerous other benefits will now be described in more detail throughout the remaining sections of this disclosure.

Example Architecture(s)

Having just described some of the high-level benefits, advantages, and practical applications provided by the disclosed embodiments, attention will now be directed to FIG. 1, which illustrates an example architecture 100 in which the disclosed principles may be employed. Architecture 100 shows a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Typically, service 105 is a local service operating on a local device, such as an edge device that is hosting a forecasting model. In some implementations, service 105 is a cloud service operating in a cloud 110 environment. In some implementations, service 105 is a hybrid service that includes a cloud component operating in the cloud 110 and a local component operating on a local device. These two components can communicate with one another.

Service 105 is generally able to make forecasting decisions and to intelligently determine when and how to rollback its forecasting decisions.

As introduced above, rollback netcode is a framework made to cope with latency issues for fast-paced, multiplayer online games. It is a combination of state prediction (i.e. forecasting), rolling back states, and fast-forwarding actions between the clients and the server. The predictions are often naïve in that the predications replicate the last known state until updated state information is made available. Forecasting code is used when action must be taken by clients in the face of other environmental changes. If input is missing, rollback will continue to simulate, predict, or forecast states using predictions for active and recovery phases, considering that the whole action is known in advance. If, after some time, the predictions are determined to be wrong, measures are available to perform a rollback operation to a past and right (i.e. known to be correct) state, thereby evoking an imperceptible glitch.

In summary, rollback netcode involves predicting and buffering states. If future information produces no match, rollback netcode fixes its past/historical data, resulting in a small (but acceptable) loss of information. Furthermore, rollback netcode relies on orchestration because certain events (e.g., as in fighting games) are relevant to many players.

Service 105 considers the existence of forecasting models running at the edge of a network. For instance, FIG. 1 shows a first client 115 (aka host) hosting a first forecasting model 120 and a second client 125 (aka host) hosting a second forecasting model 130. It may be the case that service 105 is integrated as a part of client 115 and/or client 125. Notably, forecasting model 130 is shown as being dependent on data 135 obtained from the forecasting model 120. In view of that scenario, it is typically the case that service 105 will be implemented on client 125, as generally shown in FIG. 1. It should also be noted how service 105 can accept that every agent (i.e. every hosting device hosting a forecasting model) has its own constraints, and service 105 is able to take those constraints into consideration.

Service 105 is able to minimize the impact of latency in interdependent forecasting models (e.g., forecasting models 120, 130) that are deployed in different edge layers, thus having different constraints. This is achieved by orchestrating inputs and outputs of local and remote clients, predicting nonexistent data, and rolling back incorrect predictions (if necessary) to keep the reliable states as close as possible, or at least to a level of closeness that satisfies a closeness threshold.

Before going into further detail, it will be helpful to clarify some descriptions regarding some of the actors that may be involved. For instance, a "local client" is any dependent model that requires information from another model and from a sensor as inputs. A "remote client" is any model that supplies data to local clients. Any model type may have a TDI, which is the time required by the model to decide considering that all inputs are provided. "Latency" between models is the time required for the information to travel from a source to a destination. "State" is a shared measurement that places models in a common ground. Local clients are up to date regarding the state of their own sensor data. States coming from remote clients, however, may be outdated due to latency and TDI. This disclosure often uses the term "data" in its descriptions. It should be noted how the described "data" may include the "state" referenced above. "Unreliable states" come from predictions. Forecasting procedures that use unreliable states are also considered unreliable. "Reliable states" are those that come directly from the remote clients.

Dependencies between models will often follow this convention:

MODEL(model$_i$, model$_{ii}$, ..., model$_j$)

where MODEL refers to the local client and model, refers to the remote clients.

For example, consider a scenario involving A(b), where A refers to the local model that is dependent on a remote model B (dependent on the output of this model). As another example, A(b, c) refers to a local client A that is dependent on the outputs of two remote clients, models B and C. A whole operational state might be A(b, c), B(c) and C(a). Thus, in various scenarios, a local client can be a multi-dependent client where the client depends on output from multiple other sources. Optionally, the data from the remote clients can arrive using different time stamps, or rather, having data with different time stamps. As one example, consider a scenario that A(b, c, d) is operating and unreliable points are involved (e.g., prediction points). Then, reliable data from b arrives. In such a scenario, the embodiments can optionally perform a rollback procedure for b and proceed from that point using partially reliable data until such time as all the remote clients have had their outputs rolled back, one by one.

Figure 2:
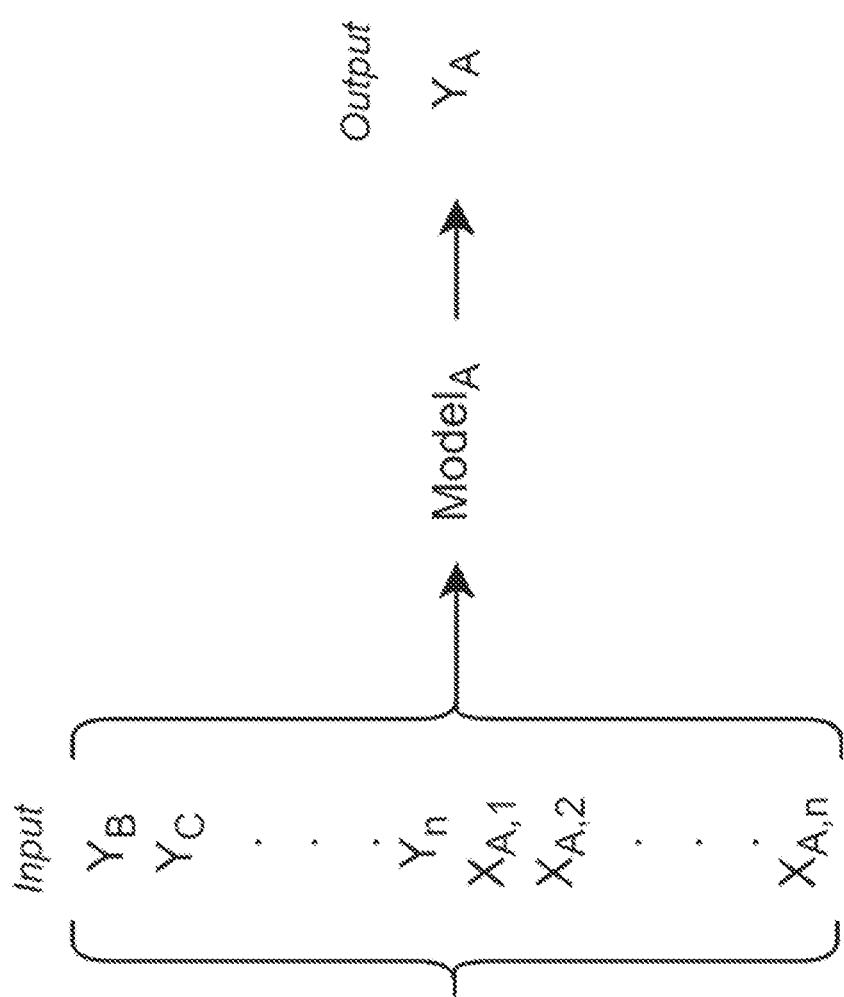

Turning briefly to FIG. 2, FIG. 2 shows a schema 200 that represents a model's input dependency and respective output. That is, FIG. 2 shows a dependent $Model_A$ structure showing the input and the output, with the input being a combination of other models' outputs Y and common features X.

Notice that the local client, $Model_A$ in this case, may be dependent on any number of remote clients $Y_n$ and on any number of features $X_{(A,n)}$. A single output is yielded from the local client, and this output may or may not be used by other local clients. In that scenario, this local client will then be considered a remote client for those other local clients.

FIG. 3 shows an example table 300 that presents a local client module and its content in one way in which the content may be stored. That is, table 300 provides an example structure of the local client module containing a dictionary with states.

Each client may have a list of lists having the statuses and state values. Status indicates the condition of the values for that state. In this example, a status of "C" (i.e. "Consolidated") indicates that the values are dependable. A status of "T" (i.e. "Temporary") indicates that the values come from a prediction, and service 105 will confirm that prediction if the prediction is unreliable.

Returning to FIG. 1, consider the following example scenario. During operation, a local client 125 requires data from sensors and from other models for forecasting. For example, FIG. 1 shows how client 125 is able to access sensor data 135, which originates from sensor 140. In some cases, sensor 140 is a part of client 125. In some cases, sensor 140 may be independent from client 125 but may communicate with client 125 in real time.

Information from other models (e.g., data 135) may take some non-negligible amount of time to arrive at client 125, but client 125 cannot wait that non-negligible amount of time because an application 145 running on client 125 may be impaired. Thus, a prediction is made regarding the information obtained from the remote clients (e.g., client 115) (e.g., one prediction per remote client). That is, the forecasting model 130 is able to generate predicted or forecasted data for the application 145, which is tasked with consuming the data 135 obtained from the client 115. Despite data 135 arriving late or in an untimely manner, application 145 still needs the data in a timely manner. As a result, the forecasting model 130 is able to forecast or generate predicted data for the application 145 to consume.

Service 105 can facilitate the generation of predictions in various different ways. For instance, a prediction can involve the use of a constant value, a replication of the last stage, or even an intelligent model. One naïve technique is to repeat the last reliable state. The assumption behind this approach is that the state of the remote client will remain the same at least for that period. This might be right sometimes, but rollback will occasionally be required.

Predictions are used because models can have different TDIs. If service 105 were to allow the models to "take their time," the resulting difference between states will become larger and larger during operation. For this reason, service 105 generates a state via prediction. That is, service 105 is able to generate, or facilitate the generation of, prediction data 150.

Having obtained prediction data 150, the local client 125 now has all the required input and can start its own forecasting procedure, which will permissibly receive TDI. The embodiments can assume that the forecasting model 130 is incremental. That is, the forecasting model 130 is not required to retain all the forecasted points, and the forecasting model 130 can output a single batch that provides point-by-point prediction(s) over time.

It might be the case that a reliable state arrives from the remote clients (e.g., client 115) while the local client 125 is processing the forecasting data or while the forecasting data is being generated, as shown by data 135. If all the required states arrive, a rollback procedure 155 may occur. The rollback procedure 155 involves the interruption of the local client's forecasting followed by the continuation of the process and the selective disregard of timestamps that have already been addressed. This disregard is performed upon the condition that the number of points up to that step is smaller than a so-called "rollback permission" (e.g., can potentially be an arbitrary value).

For example, suppose the local client 125 started to forecast a particular state (referred to as "state 3") with a prediction of one of the remote client's state (referred to as "state 2'" or "state 2 prime"), where this prediction is performed because the reliable "state 2" (not state 2' or state 2 prime) did not arrive in time. In this example scenario, client 125 performs 10 steps (or computes 10 forecasted data points) to deliver 100% of the points. With a rollback permission of 50%, the forecasting would be interrupted only if the real state arrives before the fifth step of processing (halfway to the end, representing 50% of the points). The same rollback permission may be shared among local clients as a conservative measure.

Different values may be used as the rollback permission. In some cases, the selection of the rollback permission may depend on the application 145 or may depend on user input. A rollback permission of 50% represents that, for this application, half of the forecast points are not overly important. Of course, this is an exaggeration used only to show the principle. In many scenarios, the rollback permission is set to a value of around 10% (i.e. about 10% of the forecast points may be permissibly discarded). If the user wants to do an exploration, the rollback permission can be set to an "any" value, which states that the rollback procedure 155 will be carried out regardless of when the actual states arrive.

In summary, the rollback procedure 155 allows the forecasting model 130 to temporarily stop its forecasting. The rollback procedure 155 then restarts, or rather refreshes, the forecasting procedure not from the beginning but rather at the forecasting timestamp where the forecasting was interrupted (or perhaps the next timestamp value). The initial values are wrong, but new points are determined to have correct values.

Now, consider a situation where A(b) and B(a) represent a pair of mutual interdependent models that operate in parallel. It is beneficial to have some information in advance, in particular: the TDI for each model and the latency between them. Suppose this information is available and suppose that the values are as follows: $TDI_A=8$, $TDI_B=7$, $latency_{AB}=5$. The unit here is "steps." Notice that these step values are quite similar. Notably, less benefits are realized when latency is much smaller relative to the TDIs.

Service 105 then introduces a synchronization stage, where all local clients are brought to the same state. This synchronization involves setting a step in time, retaining all necessary inputs up to that step, and then starting the forecasting operations for all of the local clients. Local clients rely on input in this stage as well, but the inputs may be non-existent. As a result, predictions are used, and these predictions can optionally be set as constants values or randomly generated (e.g., called a baseless prediction).

FIG. 4 shows an example table 400 that continues the above example. In particular, table 400 shows not only the progression of three states but also how users can visualize the techniques for both situations, with a prediction only procedure and with a prediction plus rollback procedure.

The nomenclature used in table 400 is as follows: b=baseless, s=starting, f=finished, p=predicting, rb=rollingback, r=receive. For example, s2A tells the user that state number 2 for model A is starting. Naturally, starting a state in model A is available for local client A. Steps are initialized after the synchronization stage, which is why all models are predicting the same state at the same time at Step 1.

Refer now to the "Prediction Only" situation in table 400. Notice, in $Model_A$ at step 9, state 1A is finished (f1A). Because state 1B has yet not arrived, state 2 (s2A) forecasting cannot be started unless a prediction is made (p1B). The real state 1 from remote client B (r1B) arrives during step 13 but is too late to be used. $Model_A$ will finish the state 2 forecasting at step 19, and future forecasting will now always be 2 states behind.

Now, consider the "Prediction+Rollback" situation in table 400. The rollback permission in this case is set to "any." For $Model_A$, as soon as the real state from B arrives (step 13), the rollback occurs, causing 25% (2 out of the 8 total steps) of the points to remain as unreliable points. Instead of restarting the entire 8 steps from step 1, the embodiments are able to skip the first 2 unreliable states and proceed with the forecasting operations starting at step 3.

For $Model_B$, 57% (4 out of the 7 total steps) are unreliable. Therefore, instead of restarting the entire 7 steps from step 1, the embodiments are able to skip the first 4 unreliable states and proceed with the forecasting operations starting at step 5. In the end, both situations (e.g., prediction only versus prediction plus rollback) have their corresponding "state 2" finished at the same time (e.g., $Model_A$ in both scenarios ends at line 19 and $Model_B$ in both scenarios ends at line 17), but the prediction plus rollback scenario has reliable points that can now be used by the application.

Accordingly, the general pipeline of operations for service 105 of FIG. 1 is as follows. A definition or value for the rollback permission is determined. All operating, interdependent models are identified and tagged, and their dependencies are registered. Each model's operating characteristics are stored (e.g., each model's TDI). The latencies between models are identified and stored.

Service 105 then facilitates a synchronization stage for each local client. Then, for each local client operating in parallel at its own edge layer, state "n" is finished. If state(s) "n" from remote clients have not arrived, service 105 predicts the state(s). Service 105 the facilitates the start of the forecasting process (e.g., n+1) using the predicted data.

When real state(s) from remote client(s) arrive, service 105 checks if the forecasting processing is still within the rollback permission range. If the forecasting processing is within the rollback permission range, service 105 interrupts the forecasting processing and restarts the forecasting from that point (not from the beginning). The process will then be repeated.

Another example will be helpful. This example is designed as a real-world scenario demonstrating how dependent forecasting modules may be used at the edge.

Consider an autonomous mobile robot (AMR). AMRs are equipped with advanced sensors and artificial intelligence (AI) algorithms that allow them to navigate through dynamic warehouse environments. It is possible to optimize the AMR movement using real-time interdependent forecasting systems. These sections outline some operational forecasting modules.

Model A is a dynamic obstacle prediction model. This model utilizes real-time sensor data from AMRs and warehouse infrastructure to predict the movement of dynamic obstacles within the warehouse. Dynamic obstacles can include human workers, other AMRs (e.g., model D outputs), and moving objects, such as forklifts and pallets. This model leverages machine learning algorithms and historical data to predict the future positions and velocities of these obstacles.

Model B is a traffic flow model. This model uses inputs from Model A to predict the traffic flow patterns within the warehouse. Model B analyzes the projected trajectories of dynamic obstacles and identifies potential congestion points and bottlenecks. Model B helps in optimizing the AMR routes and reduces the chances of collision, thereby increasing warehouse safety and efficiency.

Model C is a product demand model. This model gathers data from the warehouse management system, historical order records, and external factors (such as seasonality and promotions) to forecast the demand for different products within the warehouse. Accurate demand predictions enable better resource allocation and optimal AMR task assignment.

Model D is an AMR task scheduling model. Model D is based on the predictions from models A, B, and C. Model D creates real-time schedules for each AMR and assigns them specific tasks, such as picking, replenishment, or transportation. Model D optimizes the sequence of tasks to minimize travel time and to avoid potential congestion points, thereby ensuring timely deliveries and efficient warehouse operations.

Dependencies for this case are A(d), B(a), D(a, b, c, d). Model C is an independent model. The disclosed principles could be utilized for each of these various different models to improve their functioning and outputs. To apply the disclosed principles, the embodiments would rely on the latencies between the dependent models and the TDIs of each model. The embodiments would also rely on the value for the rollback permission.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
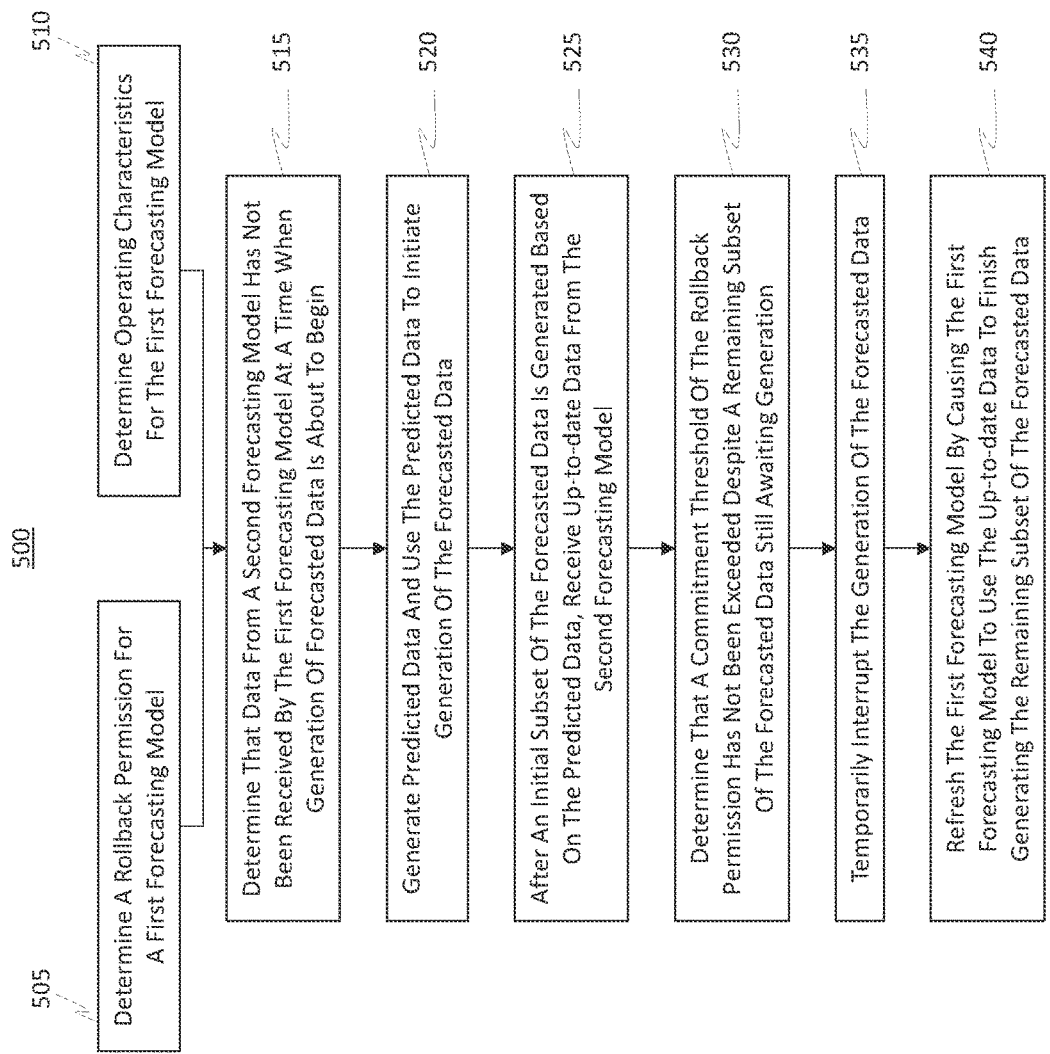
FIG. 5 illustrates a flowchart of an example method for performing a rollback procedure for a forecasting model.

Attention will now be directed to FIG. 5, which illustrates a flowchart of an example method 500 for implementing a rollback operation for a forecasting model. Method 500 can be implemented within architecture 100 of FIG. 1. Method 500 can also be performed by service 105.

Method 500 includes an act (act 505) of determining a rollback permission for a first forecasting model. The first forecasting model is tasked with generating forecasted data that is dependent on data obtained from a second forecasting model. Often, however, the data from the second forecasting model does not arrive in time (relative to when the forecasting is to commence), so predicted data is used as a substitute for the actual data from the second forecasting model. The rollback permission indicates a commitment threshold that: (i) if exceeded, prevents interruption of the generation of the forecasted data or (ii) if not exceeded, permits interruption of the generation of the forecasted data.

Act 510 includes determining operating characteristics for the first forecasting model. In some cases, the operating characteristics includes a time to data insight (TDI) for the first forecasting model. The operating characteristics may also include a latency between the first forecasting model and the second forecasting model.

Act 515 includes determining that the data from the second forecasting model has not been received by the first forecasting model at a time when the generation of the forecasted data is about to begin. In some cases, the process of determining that the data from the second forecasting model has not been received by the first forecasting model is performed within a threshold amount of time prior to when the generation of the forecasted data is about to begin, as opposed to immediately at the start of the generation process. Thus, the embodiments may include a buffer amount of time prior to the generation process to allow for the prediction process to be performed.

Act 520 includes generating predicted data that predicts the data that has not been received from the second forecasting model. The embodiments use the predicted data to initiate the generation of the forecasted data.

Generating the forecasted data is further dependent on sensor data, which is known to be reliable and accurate because it is generated locally by the local client or is generated in a manner such that there is negligible latency in accessing that data. As one example, the sensor data may be generated by a host hosting the first forecasting model. The sensor data may be generated by a sensor that is independent of the host but that is able to communicate with the host essentially without latency (e.g., less than a threshold amount of latency).

After an initial subset of the forecasted data is generated based on the predicted data, act 525 includes receiving up-to-date data from the second forecasting model. In some cases, the commitment threshold is set to a value of less than 50%. As a result, the initial subset of the forecasted data that is generated is less than 50% of all the forecasted data that is to be generated. Other percentages may be used, such as 25%, 10%, or any value between 1% and 99%. Typically, the initial subset of the forecasted data is less than half of all the forecasted data that is to be generated.

Act 530 includes determining that the commitment threshold of the rollback permission has not been exceeded despite a remaining subset of the forecasted data still awaiting generation. As an example, if the initial subset constituted 40% of the total amount of forecasted data that is to be generated, then the remaining subset would constitute 60% of the total amount of forecasted data that is to be generated. The initial 40% of forecasted data can still be leveraged by the disclosed embodiments for forecasting, but primary emphasis will be given to any up-to-date information received from the second forecasting model.

Act 535 includes temporarily interrupting the generation of the forecasted data. The interruption lasts for an amount of time suitable to enable the first forecasting model to now consider the up-to-date data from the second forecasting model.

Act 540 includes refreshing the first forecasting model. The refreshing is performed by causing the first forecasting model to use the up-to-date data to finish generating the remaining subset of the forecasted data.

Optionally, the first forecasting model may be dependent on second data that is obtained from a third forecasting model. Optionally, the first forecasting model may be dependent on additional forecasting models. Accordingly, the disclosed embodiments are able to temporarily interrupt a forecasting proceed to account for newly received, up-to-date data. The subsequent steps of the forecasting may then consider this newly received data and may refrain from continuing to rely on the previously predicted data.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
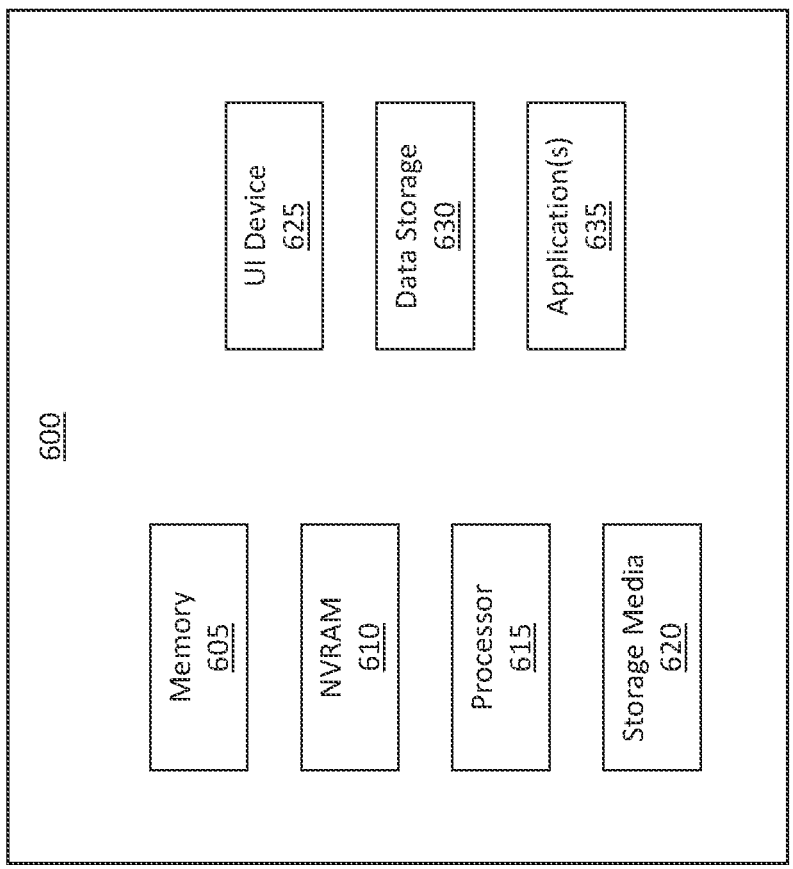
FIG. 6 illustrates an example computer system that can be configured to perform any of the disclosed operations.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. Also, where any of the aforementioned elements comprise or consist of a virtual machine (VM), that VM may constitute a virtualization of any combination of the physical components disclosed in FIG. 6. Device 600 can implement the architecture 100 of FIG. 1, or rather, device 600 can implement the clients 115 and 125.

In the example of FIG. 6, the physical computing device 600 includes a memory 605 which may include one, some, or all, of random access memory (RAM), non-volatile memory (NVM) 610 such as NVRAM for example, read-only memory (ROM), and persistent memory, one or more hardware processors 615, non-transitory storage media 620, UI device 625, and data storage 630. One or more of the memory 605 of the physical computing device 600 may take the form of solid-state device (SSD) storage. Also, one or more applications 635 may be provided that comprise instructions executable by one or more hardware processors 615 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 600 may also be representative of an edge system, a cloud-based system, a datacenter or portion thereof, or other system or entity.

The disclosed embodiments can be implemented in numerous different ways, as described in the various different clauses recited below.

Clause 1. A method comprising: determining a rollback permission for a first forecasting model, wherein the first forecasting model is tasked with generating forecasted data that is dependent on data obtained from a second forecasting model, and wherein the rollback permission indicates a commitment threshold that: (i) if exceeded, prevents interruption of generation of the forecasted data or (ii) if not exceeded, permits interruption of said generation; determining operating characteristics for the first forecasting model; determining that the data from the second forecasting model has not been received by the first forecasting model at a time when the generation of the forecasted data is about to begin; generating predicted data that predicts the data that has not been received from the second forecasting model and using the predicted data to initiate generation of the forecasted data; after an initial subset of the forecasted data is generated based on the predicted data, receiving up-to-date data from the second forecasting model; determining that the commitment threshold of the rollback permission has not been exceeded despite a remaining subset of the forecasted data still awaiting generation; temporarily interrupting the generation of the forecasted data; and refreshing the first forecasting model by causing the first forecasting model to use the up-to-date data to finish generating the remaining subset of the forecasted data.

Clause 2. The method of any of the preceding clauses, wherein the operating characteristics includes a time to data insight (TDI) for the first forecasting model.

Clause 3. The method of any of the preceding clauses, wherein the operating characteristics includes a latency between the first forecasting model and the second forecasting model.

Clause 4. The method of any of the preceding clauses, wherein generating the forecasted data is further dependent on sensor data generated by a host hosting the first forecasting model.

Clause 5. The method of any of the preceding clauses, wherein the commitment threshold is set to a value of less than 50% such that the initial subset of the forecasted data that is generated is less than 50% of all the forecasted data that is to be generated.

Clause 6. The method of any of the preceding clauses, wherein the commitment threshold is set to a value of less than 25% such that the initial subset of the forecasted data that is generated is less than 25% of all the forecasted data that is to be generated.

Clause 7. The method of any of the preceding clauses, wherein the commitment threshold is set to a value of less than 10% such that the initial subset of the forecasted data that is generated is less than 10% of all the forecasted data that is to be generated.

Clause 8. The method of any of the preceding clauses, wherein determining that the data from the second forecasting model has not been received by the first forecasting model is performed within a threshold amount of time prior to when the generation of the forecasted data is about to begin.

Clause 9. The method of any of the preceding clauses, wherein the first forecasting model is dependent on second data that is obtained from a third forecasting model.

Clause 10. The method of any of the preceding clauses, wherein the initial subset of the forecasted data is less than half of all the forecasted data that is to be generated.

Clause 11. A computer system comprising: one or more processors; and one or more hardware storage devices that store instructions that are executable by the one or more processors to cause the computer system to: determine a rollback permission for a first forecasting model, wherein the first forecasting model is tasked with generating forecasted data that is dependent on data obtained from a second forecasting model, and wherein the rollback permission indicates a commitment threshold that: (i) if exceeded, prevents interruption of generation of the forecasted data or (ii) if not exceeded, permits interruption of said generation; determine operating characteristics for the first forecasting model; determine that the data from the second forecasting model has not been received by the first forecasting model at a time when the generation of the forecasted data is about to begin; generate predicted data that predicts the data that has not been received from the second forecasting model and using the predicted data to initiate generation of the forecasted data; after an initial subset of the forecasted data is generated based on the predicted data, receive up-to-date data from the second forecasting model; determine that the commitment threshold of the rollback permission has not been exceeded despite a remaining subset of the forecasted data still awaiting generation; temporarily interrupt the generation of the forecasted data; and refresh the first forecasting model by causing the first forecasting model to use the up-to-date data to finish generating the remaining subset of the forecasted data.

Clause 12. The computer system of any of the preceding clauses, wherein the operating characteristics includes (i) a time to data insight (TDI) for the first forecasting model and (ii) a latency between the first forecasting model and the second forecasting model.

Clause 13. The computer system of any of the preceding clauses, wherein generating the forecasted data is further dependent on sensor data that is generated by the computer system.

Clause 14. The computer system of any of the preceding clauses, wherein the commitment threshold is set to a value of less than 50% such that the initial subset of the forecasted data that is generated is less than 50% of all the forecasted data that is to be generated.

Clause 15. The computer system of any of the preceding clauses, wherein determining that the data from the second forecasting model has not been received by the first forecasting model is performed within a threshold amount of time prior to when the generation of the forecasted data is about to begin.

Clause 16. The computer system of any of the preceding clauses, wherein the first forecasting model is dependent on second data that is obtained from a third forecasting model.

Clause 17. The computer system of any of the preceding clauses, wherein the initial subset of the forecasted data is less than half of all the forecasted data that is to be generated.

Clause 18. One or more hardware storage devices that store instructions that are executable by one or more processors to cause the one or more processors to: determine a rollback permission for a first forecasting model, wherein the first forecasting model is tasked with generating forecasted data that is dependent on data obtained from a second forecasting model, and wherein the rollback permission indicates a commitment threshold that: (i) if exceeded, prevents interruption of generation of the forecasted data or (ii) if not exceeded, permits interruption of said generation; determine operating characteristics for the first forecasting model; determine that the data from the second forecasting model has not been received by the first forecasting model at a time when the generation of the forecasted data is about to begin; generate predicted data that predicts the data that has not been received from the second forecasting model and using the predicted data to initiate generation of the forecasted data; after an initial subset of the forecasted data is generated based on the predicted data, receive up-to-date data from the second forecasting model; determine that the commitment threshold of the rollback permission has not been exceeded despite a remaining subset of the forecasted data still awaiting generation; temporarily interrupt the generation of the forecasted data; and refresh the first forecasting model by causing the first forecasting model to use the up-to-date data to finish generating the remaining subset of the forecasted data.

Clause 19. The one or more hardware storage devices of any of the preceding clauses, wherein generating the forecasted data is further dependent on sensor data.

Clause 20. The one or more hardware storage devices of any of the preceding clauses, wherein the commitment threshold is set to a value of less than 50% such that the initial subset of the forecasted data that is generated is less than 50% of all the forecasted data that is to be generated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining a rollback permission for a first forecasting model, wherein the first forecasting model is tasked with generating forecasted data that is dependent on data obtained from a second forecasting model, and wherein the rollback permission indicates a commitment threshold that: (i) if exceeded, prevents interruption of generation of the forecasted data or (ii) if not exceeded, permits interruption of said generation;
   determining operating characteristics for the first forecasting model;
   determining that the data from the second forecasting model has not been received by the first forecasting model at a time when the generation of the forecasted data is about to begin;
   generating predicted data that predicts the data that has not been received from the second forecasting model and using the predicted data to initiate generation of the forecasted data;
   after an initial subset of the forecasted data is generated based on the predicted data, receiving up-to-date data from the second forecasting model;
   determining that the commitment threshold of the rollback permission has not been exceeded despite a remaining subset of the forecasted data still awaiting generation;
   temporarily interrupting the generation of the forecasted data; and
   refreshing the first forecasting model by causing the first forecasting model to use the up-to-date data to finish generating the remaining subset of the forecasted data.

2. The method of claim 1, wherein the operating characteristics includes a time to data insight (TDI) for the first forecasting model.

3. The method of claim 1, wherein the operating characteristics includes a latency between the first forecasting model and the second forecasting model.

4. The method of claim 1, wherein generating the forecasted data is further dependent on sensor data generated by a host hosting the first forecasting model.

5. The method of claim 1, wherein the commitment threshold is set to a value of less than 50% such that the initial subset of the forecasted data that is generated is less than 50% of all the forecasted data that is to be generated.

6. The method of claim 1, wherein the commitment threshold is set to a value of less than 25% such that the initial subset of the forecasted data that is generated is less than 25% of all the forecasted data that is to be generated.

7. The method of claim 1, wherein the commitment threshold is set to a value of less than 10% such that the initial subset of the forecasted data that is generated is less than 10% of all the forecasted data that is to be generated.

8. The method of claim 1, wherein determining that the data from the second forecasting model has not been received by the first forecasting model is performed within a threshold amount of time prior to when the generation of the forecasted data is about to begin.

9. The method of claim 1, wherein the first forecasting model is dependent on second data that is obtained from a third forecasting model.

10. The method of claim 1, wherein the initial subset of the forecasted data is less than half of all the forecasted data that is to be generated.

11. A computer system comprising:
one or more processors; and
one or more hardware storage devices that store instructions that are executable by the one or more processors to cause the computer system to:
determine a rollback permission for a first forecasting model, wherein the first forecasting model is tasked with generating forecasted data that is dependent on data obtained from a second forecasting model, and wherein the rollback permission indicates a commitment threshold that: (i) if exceeded, prevents interruption of generation of the forecasted data or (ii) if not exceeded, permits interruption of said generation;
determine operating characteristics for the first forecasting model;
determine that the data from the second forecasting model has not been received by the first forecasting model at a time when the generation of the forecasted data is about to begin;
generate predicted data that predicts the data that has not been received from the second forecasting model and using the predicted data to initiate generation of the forecasted data;
after an initial subset of the forecasted data is generated based on the predicted data, receive up-to-date data from the second forecasting model;
determine that the commitment threshold of the rollback permission has not been exceeded despite a remaining subset of the forecasted data still awaiting generation;
temporarily interrupt the generation of the forecasted data; and
refresh the first forecasting model by causing the first forecasting model to use the up-to-date data to finish generating the remaining subset of the forecasted data.

12. The computer system of claim 11, wherein the operating characteristics includes (i) a time to data insight (TDI) for the first forecasting model and (ii) a latency between the first forecasting model and the second forecasting model.

13. The computer system of claim 11, wherein generating the forecasted data is further dependent on sensor data that is generated by the computer system.

14. The computer system of claim 11, wherein the commitment threshold is set to a value of less than 50% such that the initial subset of the forecasted data that is generated is less than 50% of all the forecasted data that is to be generated.

15. The computer system of claim 11, wherein determining that the data from the second forecasting model has not been received by the first forecasting model is performed within a threshold amount of time prior to when the generation of the forecasted data is about to begin.

16. The computer system of claim 11, wherein the first forecasting model is dependent on second data that is obtained from a third forecasting model.

17. The computer system of claim 11, wherein the initial subset of the forecasted data is less than half of all the forecasted data that is to be generated.

18. One or more hardware storage devices that store instructions that are executable by one or more processors to cause the one or more processors to:
determine a rollback permission for a first forecasting model, wherein the first forecasting model is tasked with generating forecasted data that is dependent on data obtained from a second forecasting model, and wherein the rollback permission indicates a commitment threshold that: (i) if exceeded, prevents interruption of generation of the forecasted data or (ii) if not exceeded, permits interruption of said generation;
determine operating characteristics for the first forecasting model;
determine that the data from the second forecasting model has not been received by the first forecasting model at a time when the generation of the forecasted data is about to begin;
generate predicted data that predicts the data that has not been received from the second forecasting model and using the predicted data to initiate generation of the forecasted data;
after an initial subset of the forecasted data is generated based on the predicted data, receive up-to-date data from the second forecasting model;
determine that the commitment threshold of the rollback permission has not been exceeded despite a remaining subset of the forecasted data still awaiting generation;
temporarily interrupt the generation of the forecasted data; and
refresh the first forecasting model by causing the first forecasting model to use the up-to-date data to finish generating the remaining subset of the forecasted data.

19. The one or more hardware storage devices of claim 18, wherein generating the forecasted data is further dependent on sensor data.

20. The one or more hardware storage devices of claim 18, wherein the commitment threshold is set to a value of less than 50% such that the initial subset of the forecasted data that is generated is less than 50% of all the forecasted data that is to be generated.

* * * * *